US006628704B1

United States Patent
Long et al.

(10) Patent No.: US 6,628,704 B1
(45) Date of Patent: Sep. 30, 2003

(54) EQUALIZER TRAINING FOR ADSL TRANSCEIVERS UNDER TCM-ISDN CROSSTALK ENVIRONMENT

(75) Inventors: Guozhu Long, Newark, CA (US); Chin Hung, San Jose, CA (US); Yaron Bar-Ness, San Jose, CA (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 09/514,976

(22) Filed: Feb. 29, 2000

(51) Int. Cl.[7] .................................. H04L 5/16
(52) U.S. Cl. ................ 375/219; 375/231; 375/232; 375/348; 375/350; 708/323; 370/292; 455/307
(58) Field of Search ................... 375/219, 220, 375/222, 231, 232, 260, 285, 346, 348–350; 708/305, 322, 323; 370/286, 287, 290, 292; 455/296, 307, 63

(56) References Cited

U.S. PATENT DOCUMENTS

| 6,144,695 | A | * | 11/2000 | Helms et al. | 375/222 |
| 6,266,347 | B1 | * | 7/2001 | Amrany et al. | 370/478 |
| 6,320,901 | B1 | * | 11/2001 | Arad et al. | 375/222 |
| 6,389,062 | B1 | * | 5/2002 | Wu | 375/222 |
| 6,393,051 | B1 | * | 5/2002 | Koizumi et al. | 375/220 |
| 6,449,316 | B1 | * | 9/2002 | Matsumoto et al. | 375/285 |
| 6,456,654 | B1 | * | 9/2002 | Ginesi et al. | 375/229 |
| 6,515,713 | B1 | * | 2/2003 | Nam | 348/614 |

OTHER PUBLICATIONS

ITU Telecommunication Standardization Sector Recommendation G.992.2, "Splitterless Asymmetric Digital Subscriber Line (ADSL) Transceivers," 185 pp., Mar. 1999.

ITU Telecommunication Standardization Sector Recommendation G.992.1, "Asymmetrical Digital Subscriber Line (ADSL) Transceivers," 264 pp., Jul. 1999.

* cited by examiner

Primary Examiner—Stephen Chin
Assistant Examiner—Dac V. Ha
(74) Attorney, Agent, or Firm—Fenwick & West LLP (57) ABSTRACT

A technique for training an equalizer of an ADSL Annex C transceiver is provided. The technique defines the points in the transmission sequence at which equalizer training should take place, and what symbols comprising the transmission should be used for training. The technique avoids the effect of strong TCM-ISDN cross-talk noise. The equalizer is trained so as to achieve optimal communication channel performance. During the TEQ training phase, the cyclic prefix is not introduced. The TEQ is trained only on FEXT symbols except the FEXT symbols adjacent to NEXT symbols. In the early phase of FEQ training, the cyclic prefix is not introduced. The FEQ is trained on FEXT symbols only except the FEXT symbols adjacent to NEXT symbols. During a late training phase after the cyclic prefix is introduced, the training of the FEQ is continued by using signals received on all FEXT symbols only. Due to the introduction of the cyclic prefix and the time-domain equalizer, the inter-symbol interference is basically eliminated. Therefore, the FEXT symbols adjacent to NEXT symbols are not affected by the TCM-ISDN noise that exists in NEXT symbols only. As a result, the received signal on those symbols can also be used to train FEQ. In a show-time phase, the FEQ is updated on FEXT and NEXT symbols for bins where the number of bits per symbol is non-zero.

44 Claims, 10 Drawing Sheets

FEXT$_C$ training symbol    NEXT$_C$ training symbol

EQUALIZER TRAINING FOR ADSL TRANSCEIVERS UNDER TCM-ISDN CROSSTALK ENVIRONMENT

BACKGROUND OF THE INVENTION

1. Field of the Invention

This invention relates to digital subscriber line transceivers for communicating over telephone subscriber loops, and more particularly, to performing equalizer training for asymmetric digital subscriber line transceivers under TCM-ISDN crosstalk environment.

2. Description of the Related Art

The Telecommunications Standards Section of the International Telecommunication Union (sometimes designated as ITU-T) provides recommendations to facilitate the standardization of the telecommunications industry. Two of these recommendations are referred to as G.992.1 and G.992.2. Recommendation G.992.1 refers to an asymmetric digital subscriber line (ADSL) transceiver that is an ADSL industry standard for network access at rates up to 8.192 mbit/s downstream (toward subscriber) and 640 kbit/s upstream (toward central office or network administrator). Recommendation G.992.2, on the other hand, refers to an ADSL transceiver that is a lower data rate version of a G.992.1 ADSL transceiver. Bit rates up to 1.5 mbit/s in the downstream direction and 512 kbit/s upstream are possible with this standard. Factors such as the electrical characteristics of the customer's equipment, the distance between the subscriber and central office, and the error rate allowed all contribute to the bit rate of the G992.1 and G992.2 transceivers.

The G.992.1 and G.992.2 standards are similar to one another in that they both use the discrete multi-tone (DMT) modulation technology. DMT modulation employs multiple carriers for both upstream and downstream communication. Frequency-division-multiplexing is often used, where upstream and downstream communication use carriers in different frequency bands, while spectrum overlapping is also possible by using echo cancellers. By working with a large number of carriers rather than a single carrier, the available channel capacity is maximized thereby optimizing performance of the transmission. Once a connection between the central office side and the customer side has been established, the transceivers continue to monitor the changing signal-to-noise ratios on the line and swaps bits from one carrier to another to maintain system performance. One of the major differences between the standards is that G.992.1 downstream communication uses carriers up to index 255, while G.992.2 downstream communication uses carriers only up to index 127. Thus, standard G.992.2 has a smaller available downstream bandwidth than standard G.922.1.

Both G.992.1 and G.992.2 have an Annex C that defines a special recommendation for ADSL transceivers under the time compression multiplexing—integrated services digital network (TCM-ISDN) noise environment. Each of these respective Annexes is herein incorporated by reference in its entirety. Reference to "Annex C" may be to either or both of G.992.1 and G.992.2. TCM-ISDN is defined in ITU-T recommendation G.961, Appendix III. This recommendation is also herein incorporated by reference in its entirety. Recommendation G.961 Appendix III uses a ping-pong scheme to alternately transmit data streams in two directions under the control of a 400 Hz clock referred to as the TCM-ISDN timing reference (TTR). G.992.1 and G.992.2 Annex C transceivers also transmit signals based on this TTR signal. For example, the ATU-C (central office transceiver) transmits the data stream in the first half of the TTR period, and the ATU-R (customer transceiver) transmits basically in the second half of the TTR period.

Recommendations G.992.1 and G.992.2 define the ADSL transceiver unit on the central office side (referred to as "ATU-C"), and the ADSL transceiver unit on the remote terminal or customer premises side (referred to as "ATU-R"). Although each recommendation specifies the transmitter portion of the transceiver, the receiver portion of the transceiver is left undefined. Thus, transceiver designers have a significant amount of discretion in designing this receiver portion.

In designing the receiver portion of a transceiver, one must consider how to correct for channel distortion and timing errors. Crosstalk interference between the various wire-pairs bundled together in a conventional copper transmission line is a major contributor to channel impairment. Generally, crosstalk noise belongs to one of two groups: near end crosstalk (NEXT) and far end crosstalk (FEXT). NEXT is the crosstalk caused by signals in adjacent lines transmitted from the same end of the cable, while FEXT is the crosstalk caused by signals in adjacent lines transmitted from the remote end of the cable. NEXT is typically much stronger than FEXT. Annex C transceivers synchronize the transmission and reception to the TCM-ISDN timing reference so that the receiver receives data signal in FEXT time where the signal-to-noise ratio is higher, while it receives no data signal or data signal at a lower data rate in NEXT time where the signal-to-noise ratio is low.

The ADSL symbols under FEXT noise are called FEXT symbols, while all the other symbols are called NEXT symbols. As such, the ADSL transceivers function under a TCM-ISDN crosstalk noise environment having a level that changes periodically. The crosstalk noise level during the FEXT symbols is quite low, so the data can be transferred at a higher rate. The crosstalk noise level during the NEXT symbols, however, is high. Thus, while functioning under the NEXT symbols, the data transmission may be at lower rate (e.g., in a dual bitmap mode), or paused (e.g., in a FEXT bitmap mode, also referred to as a single bitmap mode).

An equalizer can be used to correct for channel distortion. Typically, the receiver portion of a transceiver is comprised of, among other components, an equalizer. Typically, such an equalizer is comprised of: (1) a time-domain equalizer (TEQ), and (2) a number of frequency-domain equalizers (FEQ). The TEQ compensates the channel distortion in the time domain and eliminates inter-symbol interference before the signal is converted into the frequency domain through a Fast Fourier Transform (FFT). After FFT, there is one FEQ for each carrier (sub-channel) employed in the DMT modulation scheme. Because the recommendations are silent as to the receiver portion of the transceiver, they are also silent to equalizer implementation and training. As such, there are no known techniques for performing equalizer training in ADSL Annex C transceivers.

What is needed, therefore, is a technique for training an equalizer of an ADSL Annex C transceiver. The equalizer must be trained so as to achieve optimal communication channel performance. The technique must define what periods during the transmission sequence the equalizer should be trained. Additionally, the technique must define what symbols should be used for training. The technique must substantially eliminate inter-symbol interference, and neutralize the effect of strong cross-talk noise (e.g., NEXT).

SUMMARY OF THE INVENTION

The present invention provides a technique for training an equalizer of an ADSL Annex C transceiver. The equalizer is trained so as to achieve optimal communication channel performance. The technique defines the periods in the transmission sequence at which equalizer training takes place. Additionally, the technique defines what symbols comprising the transmission are used for training. The technique neutralizes the effect of strong cross-talk noise and substantially eliminates inter-symbol interference.

Once a communication link is established between two ADSL Annex C transceivers, the channel distortion associated with that link is compensated for by performing equalizer training in the receiver sections of both transceivers. This equalizer training is accomplished, in part, by sending REVERB signals from the transmitter of one transceiver to the receiver of the remote transceiver. During a TEQ training phase, the cyclic prefix is not introduced. In accordance with the present invention, the TEQ is trained only on FEXT symbols except the FEXT symbols adjacent to NEXT symbols. Thus, the signals received during NEXT symbols and the FEXT symbols adjacent to NEXT symbols are not used for TEQ training. In an early phase of FEQ training, the cyclic prefix is not introduced. The FEQ is also trained on FEXT symbols only except the FEXT symbols adjacent to NEXT symbols.

During a late training phase after the cyclic prefix is introduced, the training of the FEQ is continued by using signals received on all FEXT symbols only. Due to the introduction of the cyclic prefix and the time-domain equalizer, the inter-symbol interference is basically eliminated. Therefore, the FEXT symbols adjacent to NEXT symbols are not affected by the TCM-ISDN noise that exists in NEXT symbols only. As a result, the received signal on those symbols can also be used to train the FEQ. p In the SHOWTIME phase, the FEQ can be updated on FEXT and NEXT symbols for channels where the number of bits per symbol is non-zero. Since those channels are used for data transmission, their respective FEQ's need to be updated so that those FEQ's can keep tracking the channel changes. Also in the SHOWTIME phase, the adaptation of the FEQ is performed because the signal to noise ratio at those channels is sufficient. Otherwise, those channels would not have been selected for data transmission. Only one FEQ per communication sub-channel is used when operating in a FEXT bitmap (FBM) mode or in a dual bitmap (DBM) mode.

By employing the present invention, the performance of the TEQ as well as the training and the later adaptation of the FEQ, are not affected by the strong NEXT interferences existing in the TCM-ISDN. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
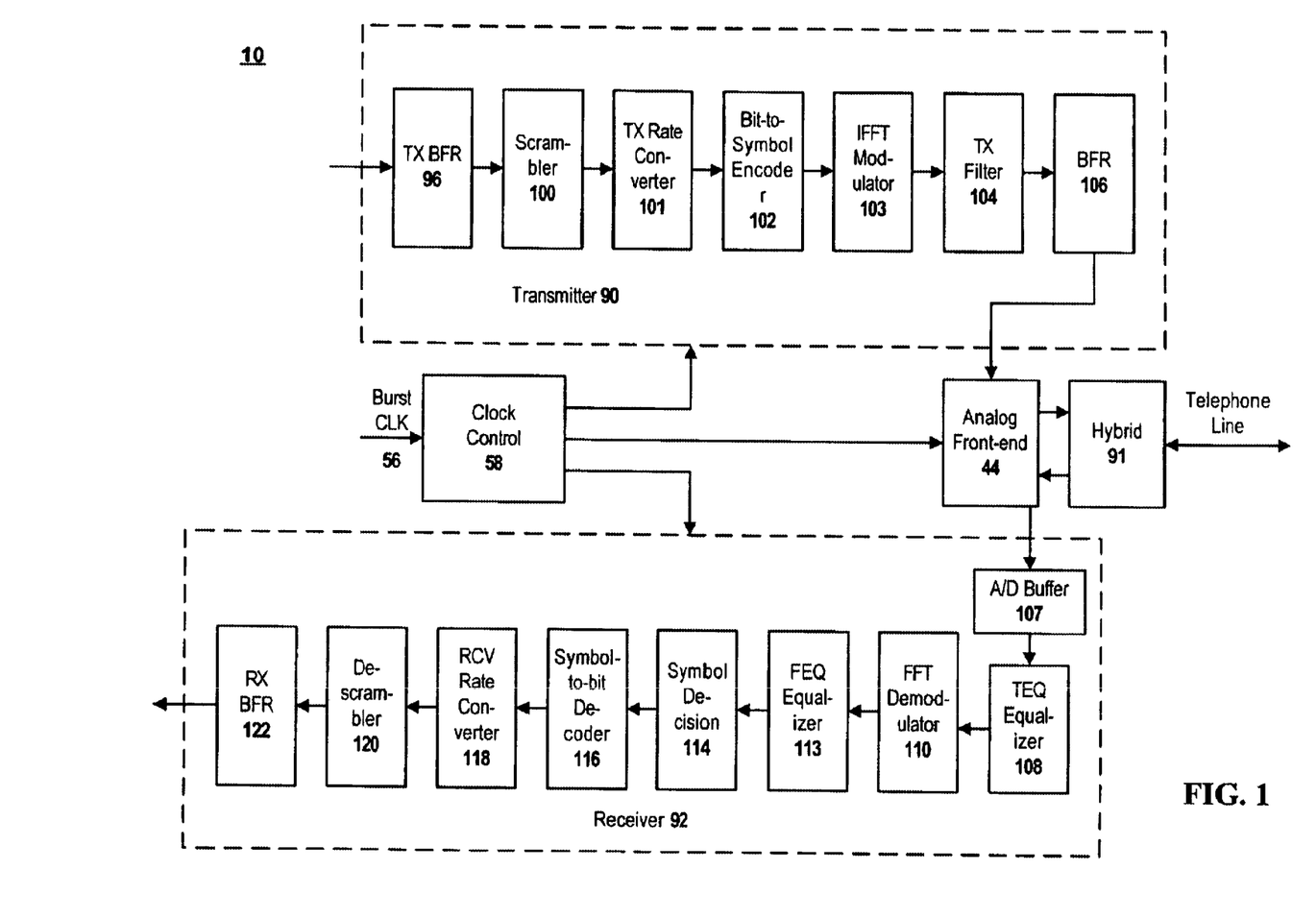
FIG. 1 is a block diagram of an exemplar ADSL transceiver in accordance with the present invention.

FIG. 1 is a block diagram of an exemplar ADSL transceiver in accordance with the present invention. Transceiver 10 is comprised of a transmitter 90, an analog front-end 44, a hybrid circuit 91, a clock control unit 58, and a receiver 92. One or more of the functions shown in FIG. 1 may be implemented by a digital signal processor (DSP). For example, transmitter 90 can alternatively be a processor 90 that has the functionality of a transmitter. Likewise, receiver 92 can alternatively be a processor 92 that has the functionality of a receiver. Additionally, one or more of the functions shown in FIG. 1 may be implemented in software, hardware, firmware, or any combination thereof. Those skilled in the art will appreciate that although the components comprising transceiver 10 are depicted as individual units, any combination of the components may also be implemented in a single discrete unit. For example, transmitter 90 and receiver 92 can be implemented in a single DSP chip. Transceiver 10 can be used either at the customer premises or at the central office. The central office implementation is shown in the example.

Hybrid circuit 91 performs 2-to-4-wire conversion, which converts the bi-directional two-wire signal from the telephone line into two pairs of one-directional transmissions. One pair is for receiving and the other pair is for transmitting. Hybrid circuit 90 can include a splitter to filter-out undesired signals outside a typical DSL transmission band. For example, the low frequency plain old telephone service (POTS) signal is blocked by the splitter so that it will not interfere with the high frequency ADSL signal, as is well known in the art.

Analog front-end 44 includes an analog-to-digital (A/D) converter and a digital-to-analog (D/A) converter (not shown). The separated, filtered signal received by analog front-end 44 from hybrid circuit 91 is converted from analog to digital by the A/D converter, and is sent to receiver 92. Analog front-end 44 may further comprise a gain adjust module for optimizing the signal sent to receiver 92. The output from transmitter 90, on the other hand, is converted from digital to analog by the D/A converter in analog front-end 44, and is filtered and sent to hybrid circuit 91.

Transmitter 90 is comprised of a transmit buffer 96, a scrambler 100, a transmitter rate converter 101, a bit-to-symbol encoder 102, an IFFT modulator 103 to combine all the sub-channels, a transmitter filter 104 and a buffer 106. Data ready for transmission is received from the customer's data terminal equipment or from the telephone company's network, and is buffered by transmit buffer 96.

Scrambler 100 operates on the input data bits in order to randomize the data pattern. Such randomizing is for optimizing the transmission performance. Scrambling also minimizes the possibility of repetitive data patterns. In one embodiment, scrambler 100 is further combined with a forward error correction (FEC) encoder module and an interleaver module. Such modules can be implemented to further ensure a robust and efficient transmission, as is well known in the art.

Transmitter rate converter 101 can be used to insert dummy bits into the scrambled data stream to equalize the difference between the user data rate, which is typically a multiple of 32 kilobits per second (kbps), and the physical layer data rate, which is not necessarily a multiple of 32 kbps.

Bit-to-symbol encoder 102 receives sequences of bits from transmitter rate converter 101 and encodes them as signal points in the signal constellation. Since QAM modulation is used, a two-dimensional constellation is used where each signal point in the constellation has an in-phase component and a quadrature component. Depending on the constellation size of each sub-channel, each symbol carries multiple bits. For example, 64-QAM has 64 points in the constellation, meaning that in each symbol, a sub-channel can carry six binary bits. An even bigger constellation may be used to carry more bits per symbol. The total number of bits transmitted is the sum of the number of bits transmitted by each sub-channel.

In one embodiment, bit-to-symbol encoder 102 further comprises a convolutional encoder module for obtaining the coding gain. The bit-to-symbol encoder 102 is followed by IFFT modulator 103 that modulates constellations (e.g., QAM constellations) on to the available transmission sub-channels and combines all the sub-channels together for transmission.

The transmission rate of transmitter 90 is a function of the total number of bits per symbol and the symbol rate. For example, using 96 sub-channels with each sub-channel carrying 8 bits per symbol, at a 4 K-baud symbol rate, a transmission rate of 4×96×8=3072 kbit/second is achieved. Due to TCM-ISDN noise, if FBM mode is used, each transmission direction sends data in only 126/340=37% of the time. Hence, the average transmission rate in the exemplar case above is 1138 kbps~1120 kbps (multiple of 32 kbps). Thus, a user data rate of 1120 kbps can be achieved, while the physical layer data rate is 1138 kbps. Dummy bits inserted by transmitter rate converter 101 compensate for the difference between the two rates.

Transmission filter 104 shapes the transmitted signal and reduces out-of-band signal components. A cyclic prefix can be added before the transmission filter 104 to add separation between symbols in order to help the receiver to eliminate the inter-symbol interference. Buffer 106 stores the filtered samples for transmission. The D/A converter of analog front-end 44 converts the samples to analog signals. Those analog signals are filtered, amplified and coupled to the telephone line via hybrid 91.

At the central office, clock control 58 receives burst clock 56 (also referred to as TCM-ISDN timing reference or TTR) from the central office TCM-ISDN burst-timing control circuit. The TTR is used to lock the ATU-C local clock frequency, which controls the ATU-C A/D and D/A sampling rates, and the transmitter and receiver symbol rates. The ATU-C transmitter also checks the phase of the system TTR, and locks its hyperframe window to the TTR. At the ATU-R, the receiver tracks the received signal from ATU-C transmitter, and locks the local clock to the ATU-C's clock frequency. ATU-R also detects the hyperframe pattern from the received signal from the ATU-C, and aligns its symbol counter to the hyperframe pattern (hyperframe alignment). The symbol counter is used to track the symbol index, and is incremented by 1 for each symbol. The counter is reset to zero when it reaches 345.

Receiver 92 includes an A/D buffer 107, a time-domain equalizer (TEQ) 108, an Fast Fourier Transform (FFT) demodulator 110, a frequency-domain equalizer (FEQ) 113, a symbol decision block 114, a symbol-to-bit decoder 116, a receiver rate converter 118, a descrambler 120 and the receiver buffer 122. A/D buffer 107 receives the digital signal from the A/D converter of analog front-end 44. TEQ 108 compensates for channel distortion in the time-domain such that the combined impulse response of the communication channel and TEQ 108 is within the length of the cyclic prefix. FFT demodulator 110, which is coupled to TEQ 108, separates and demodulates all the sub-channels. The cyclic prefix is removed after TEQ 108.

After FFT demodulator 110, FEQ 113 provides further compensation for amplitude and phase distortion for each carrier (carrier is also referred to as bin or sub-channel). Thus, there is one FEQ 113 for each sub-channel of communication. In one embodiment, TEQ 108 and FEQ 113 are implemented by software instructions that are executed in a digital signal processor. Alternatively, TEQ 108 and FEQ 113 may be implemented in firmware, hardware, or any combination of software, firmware and hardware. The equalizer coefficients characterize the distortion of the associated channel and can be used to compensate, or rather, equalize that distortion.

Symbol decision block 114 decides which signal point from the signal constellation represents the received signal at each sub-channel. The actual structure of symbol decision block 114 may vary depending on the encoding scheme used by the remote transmitter. For the uncoded system, symbol decision block 114 may be just a slicer. For a Trellis-code modulation system, a Viterbi decoder is often used for block 114 to improve the reliability of the decision. The difference between the FEQ output and the decision is the error signal which is used to adjust the FEQ coefficients.

Since in each symbol, each sub-channel can encode a series of bits, symbol-to-bit decoder 116 converts the symbols to binary bits. In one embodiment, symbol-to-bit decoder 116 is used to recover the bit stream from the transmitted constellations. Receiver rate converter 118 removes dummy bits inserted by the remote transmitter rate converter 101, and passes only user data bits to descrambler 120. Descrambler 120 restores the bits to their original value before. they were scrambled by scrambler 100 of the transmitting transceiver. The de-scrambled bit stream is buffered by receive buffer 122 before being sent to a high-speed data network at the central office, or to the customer's data terminal equipment. In one embodiment, descrambler 120 is further combined with a forward error correction (FEC) decoder module and a deinterleaver module to ensure a robust and efficient transmission.

Those skilled in the art will appreciate that transceiver 10 shown in FIG. 1 is only an example of one possible embodiment for a transceiver. Other transceivers may be comprised of components not specifically represented in the figure (e.g., tone ordering module, CRC unit). Also, other transceivers may not include the components shown in FIG. 1. The configuration of the transceiver is dependent on the particular application. Thus, the present invention is intended to cover all the various configurations of a transceiver, and is not intended to be limited by the embodiment shown.

Figure 2A:
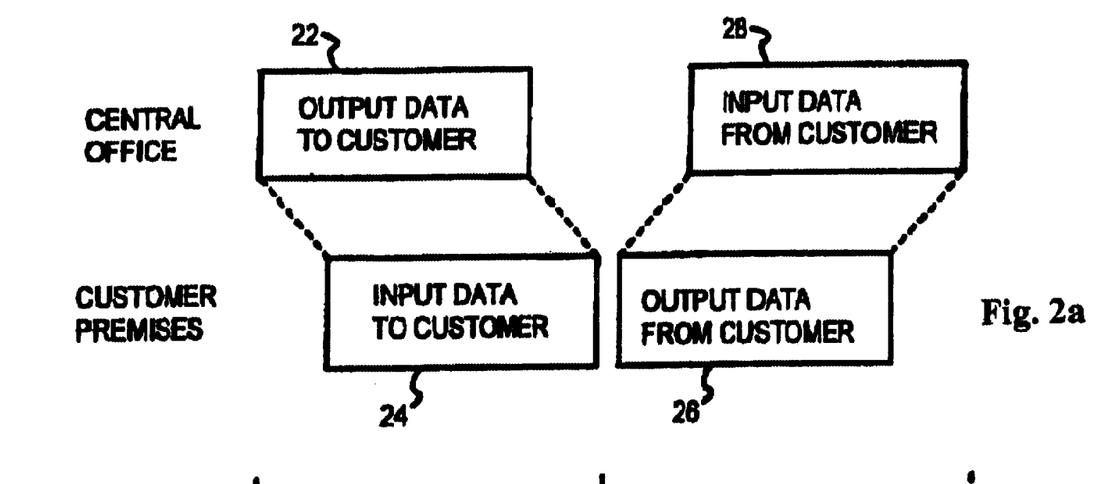
FIG. 2a illustrates an exemplar timing diagram for a TCM-ISDN line in accordance with the present invention.

FIG. 2a illustrates an exemplar timing diagram for a TCM-ISDN line in accordance with the present invention. During time period or window 22, data is output from a TCM-ISDN transceiver at the central office to the remote ISDN transceiver at the customer's premises. This data arrives at the remote transceiver during reception window 24. A pause occurs when no data is transmitted. This pause is sometimes called the turnaround period. During period 26, upstream data is transmitted from the remote transceiver to the central office transceiver during window 28. At any particular time, only one end of the TCM-ISDN line is transmitting, while the other end is receiving. Echo cancellation is not needed since the echo of the transmitted signal does not have to be removed. While such a TCM-ISDN system is effective for reducing cross-talk in the TCM-ISDN system itself, it is difficult to add newer ADSL systems in the same cable bundle because of the cross-talk from the ISDN lines.

Figure 2B:
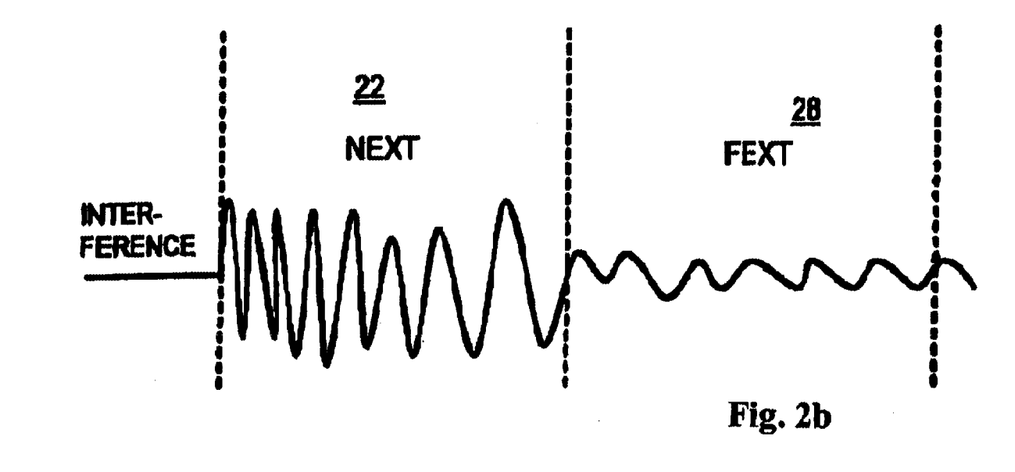
FIG. 2b illustrates an exemplar diagram of interference at a central office from several ISDN lines transmitting in synchronization.

FIG. 2b illustrates an exemplar diagram of interference at a central office from several ISDN lines transmitting in synchronization. In general, the transceiver of the central office receives NEXT noise from the ISDN in the first half of the TTR period and FEXT noise from the ISDN in the second half of the TTR period. On the other hand, the remote transceiver at the customer's premises receives FEXT noise from the ISDN in the first half of the TTR period and NEXT noise from the ISDN in the second half of the TTR period. As shown in FIG. 2, a burst of data is sent from the central office to the remote sites during transmit window 22. NEXT is particularly strong at the central office side during transmit window 22 since the ISDN devices at the central office are all transmitting. During receive time window 28, these ISDN devices at the central office are not transmitting. Interference is primarily FEXT, which is weaker than NEXT since it is attenuated by the length of the telephone line.

Annex C defines a dual bitmap (DBM) encoding method for providing dual bitmaps that are switched synchronized with the hyperframe pattern that is synchronized to the TTR to provide a data stream having dual bit rates. The method is based on the observation that for short local loops (e.g., less than about two kilometers), the channel signal-to-noise ratio (SNR) can be sufficiently high during NEXT interference to transmit data at a low bit rate. Thus, under certain conditions DBM allows full-duplex operation of TCM-DSL transceivers by employing different bit rates under NEXT and FEXT interference, respectively.

For longer local loops, however, the SNR during NEXT time is typically too low for transceivers to send any data. In that case, the data transmission occurs only in FEXT time. This is referred to as FEXT bitmap (FBM) encoding (also referred to as single bitmap (SBM) encoding), which is a special case of DBM encoding. With FBM, the central office and the remote transceivers are transmitting data only in FEXT time, and do not transmit data simultaneously (i.e., half-duplex mode).

In DBM encoding, bit rates can be changed by changing the bitmaps used to encode the symbols to be transmitted. As is understood by those skilled in the art, a "bitmap" determines the number of bits that can be encoded into each sub-channel in a symbol. A "symbol" is the basic unit of information transmitted by the transceiver. The number of bits encoded into each sub-channel in a symbol is limited by the quality of the communication channel. The quality of the communication channel can be represented by its SNR. Thus, a system employing DBM includes two bitmaps for providing different data rates for NEXT time and FEXT time, respectively. A system employing FBM, on the other hand, needs only one bitmap since no data signal is transmitted in NEXT time.

Figure 3A:
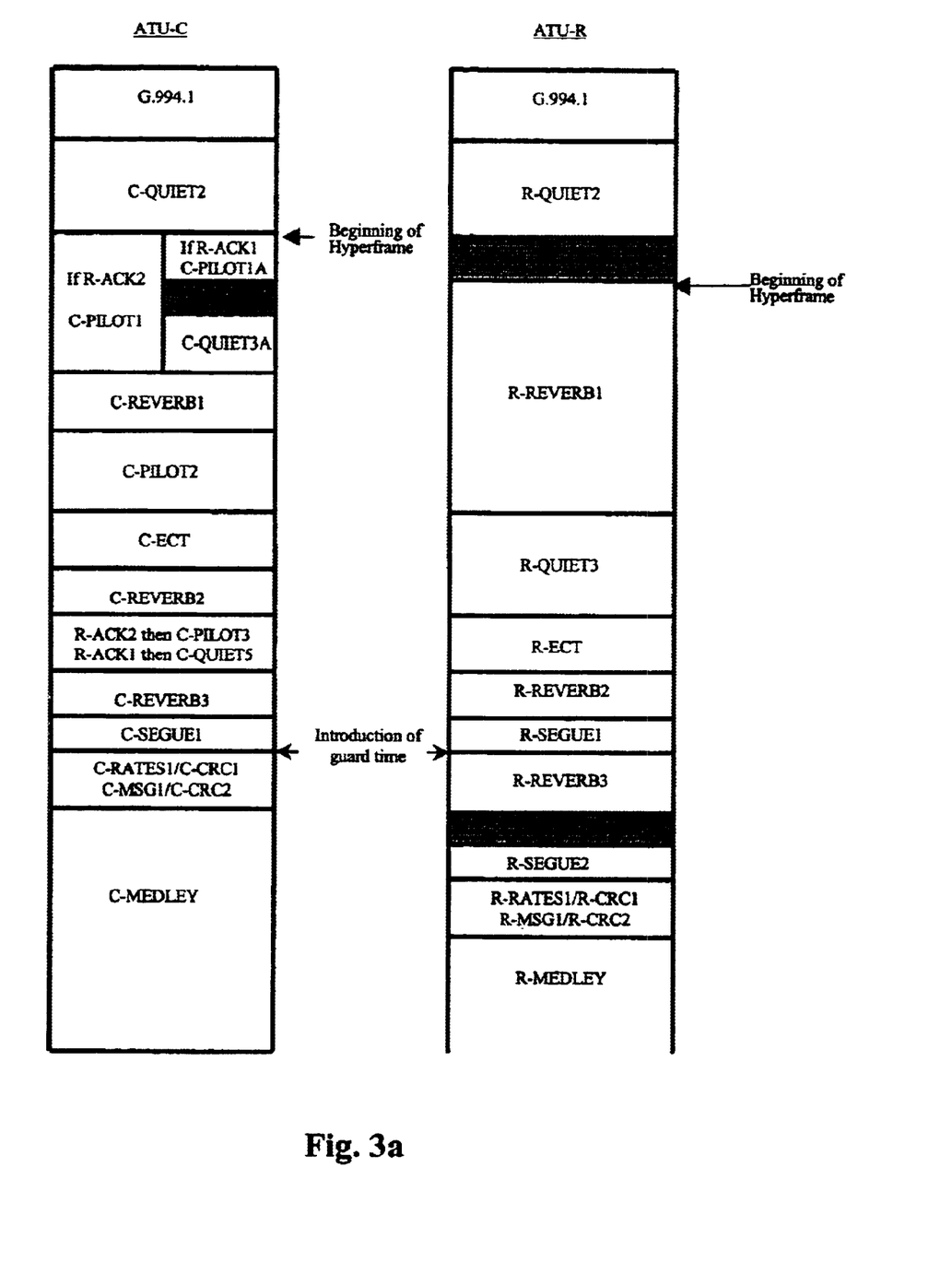
FIGS. 3a and 3b show an exemplar timing diagram of the ATU-C transmit sequence (left side of figures) and of the ATU-R transmit sequence (right side of figures) in accordance with the present invention.
Figure 3B:
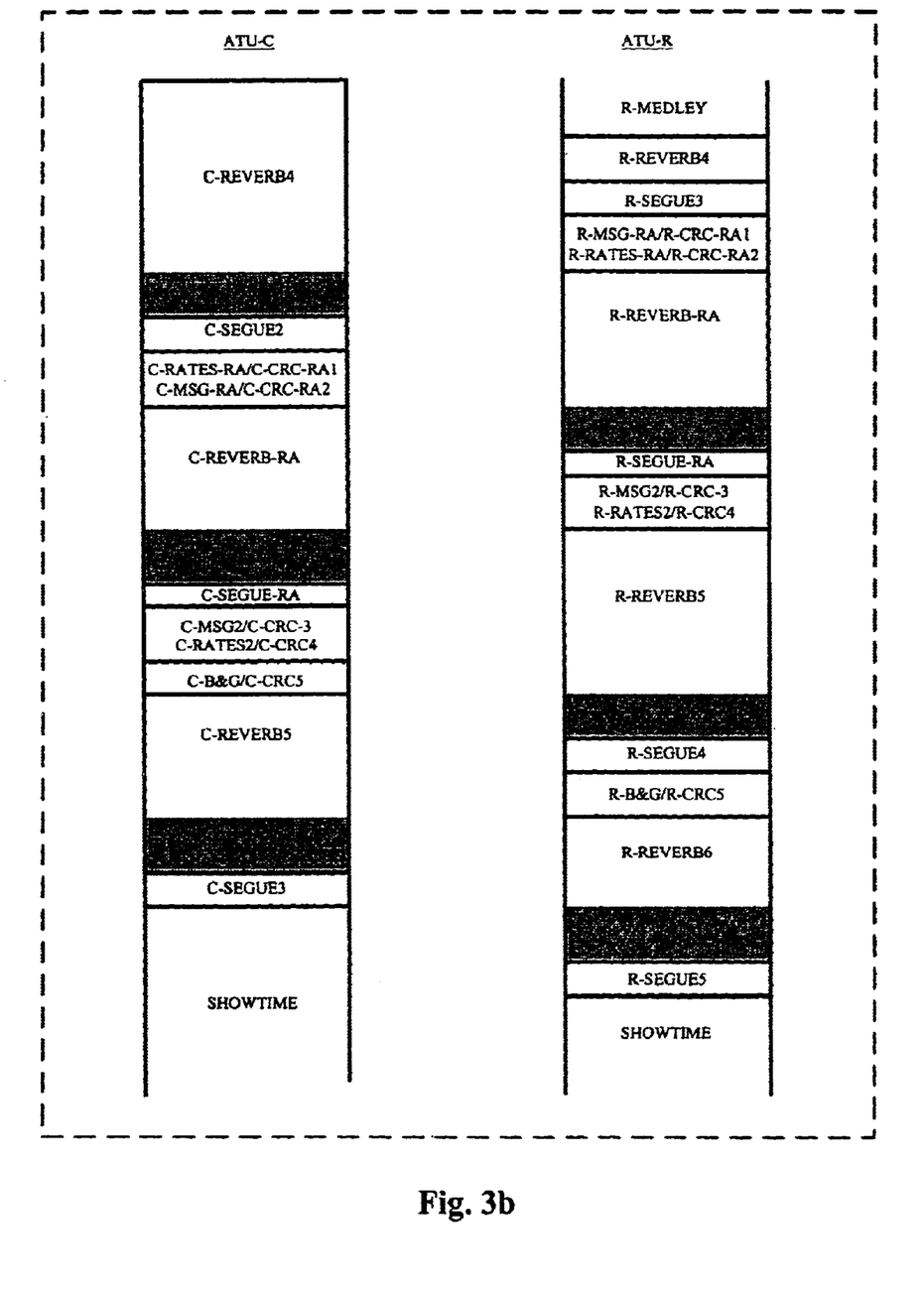

FIGS. 3a and 3b show an exemplar timing diagram of the ATU-C transmit sequence (left side of figures) and of the ATU-R transmit sequence (right side of figures) in accordance with the present invention. The ATU-C transmit sequence defines the transmission from the central office to the remote customer's premises. This sequence will be discussed first. Recommendation G.994.1 defines a G.hs handshaking scheme where preliminary information is exchanged between the ATU-C and the ATU-R. During the initial training phase, ATU-R receives the training signal periods C-PILOT1 through C-SEGUE1 where the training symbols are without cyclic prefix.

During transmission signal period C-PILOT1, the ATU-R detects the hyperframe pattern from the signal transmitted from the ATU-C based on the phase information in a dedicated tone (index 48). This is called a TTR alignment, or hyperframe alignment. This alignment ensures that the ATU-R transmits its training signal in alignment with the TTR. During C-REVERB1, the receiver of the ATU-R aligns the symbol boundary preliminarily. However, the symbol boundary may not be accurate until TEQ 108 is trained. Thus, once TEQ 108 is trained, the symbol boundary can be realigned. Pilot tracking starts at C-PILOT1 as well. The ATU-R adjusts its automatic gain control (AGC) to an appropriate level during transmission signal period C-REVERB1, and may continue to do so through transmission signal period C-ECT.

During transmission signal period C-REVERB2, TEQ 108 is selectively trained. At this point in the transmission sequence, inter-symbol interference is not eliminated because the cyclic prefix has not been introduced yet. As such, not only are the NEXT symbols noisy, but also the FEXT symbols adjacent to NEXT symbols are noisy. TEQ 168 is, therefore, trained only on the FEXT symbols that are not adjacent to NEXT symbols transmission signal period C-REVERB2. However, TEQ 108 will not be used until transmission signal period C-REVERB3. Once TEQ 108 is trained, the symbol boundary is realigned.

Figure 4A:
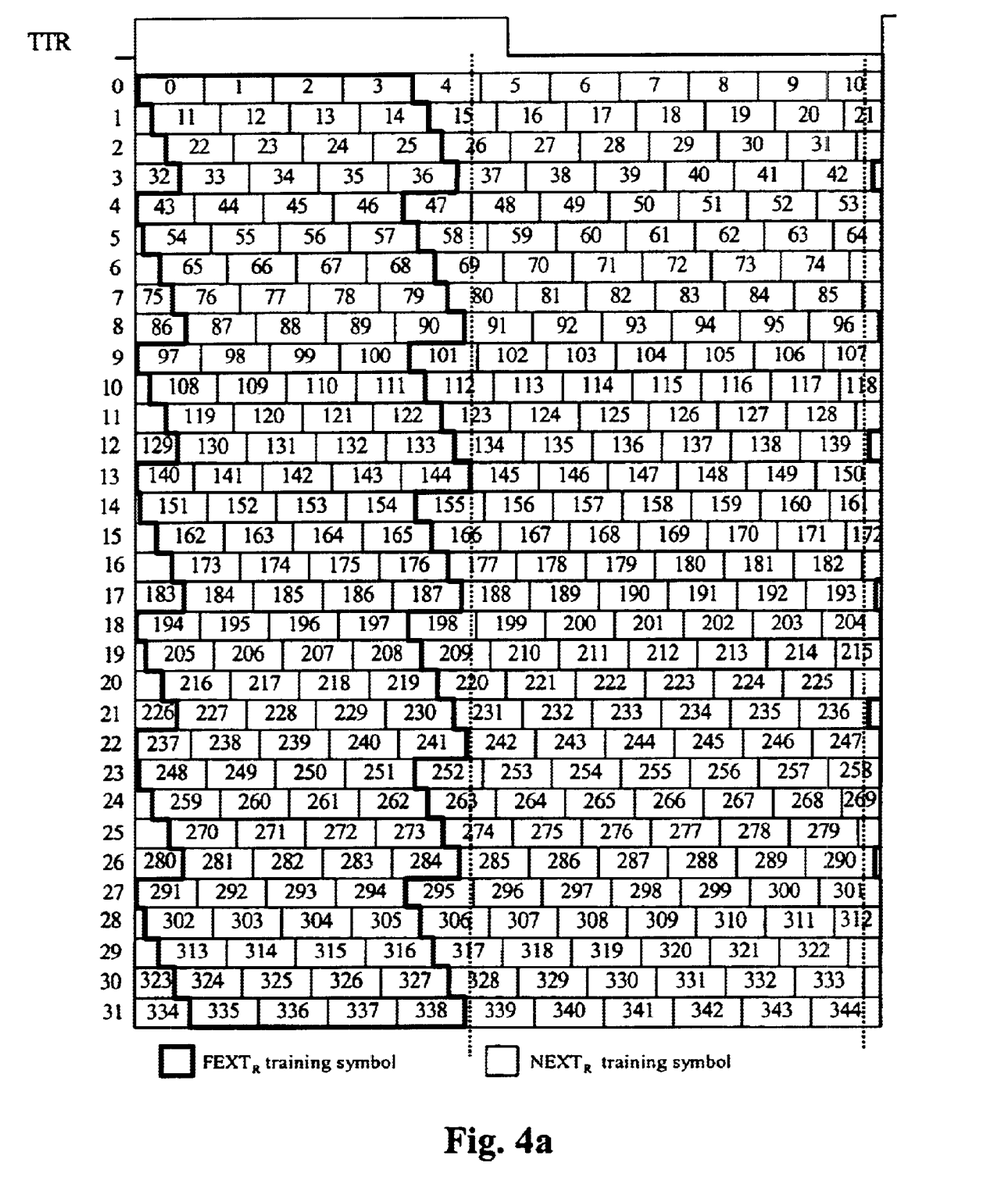
FIG. 4a is an exemplar downstream symbol pattern in a hyperframe without a cyclic prefix inserted in accordance with the present invention.

During transmission signal period C-REVERB3, the signals received by the ATU-R are propagated through TEQ 108 and FFT demodulator 110. The frequency domain signals that are the output of FFT demodulator 110 are used to train FEQ 113. This FEQ 113 training is referred to as selective FEQ reference training. Although the TEQ is used, inter-symbol interference is not eliminated yet because the cyclic prefix has not been introduced yet. Therefore, not only are the NEXT symbols noisy, the FEXT symbols adjacent to NEXT symbols are also noisy due to inter-symbol interference. Hence, reference training of FEQ 113 is performed only on the FEXT symbols that are not adjacent to NEXT symbols transmission signal period C-REVERB3. The FEQ 113 reference training, therefore, is selective. The downstream training symbol pattern in a hyperframe without a cyclic prefix is shown in FIG. 4a. During TEQ 108 training, a set of TEQ coefficients is learned. The received signal later passes through the trained TEQ 108 (hence, the TEQ is used). Those skilled in the art will appreciated that TEQ 108 and FEQ 113 can be implemented as finite impulse response (FIR) filters.

Figure 4B:
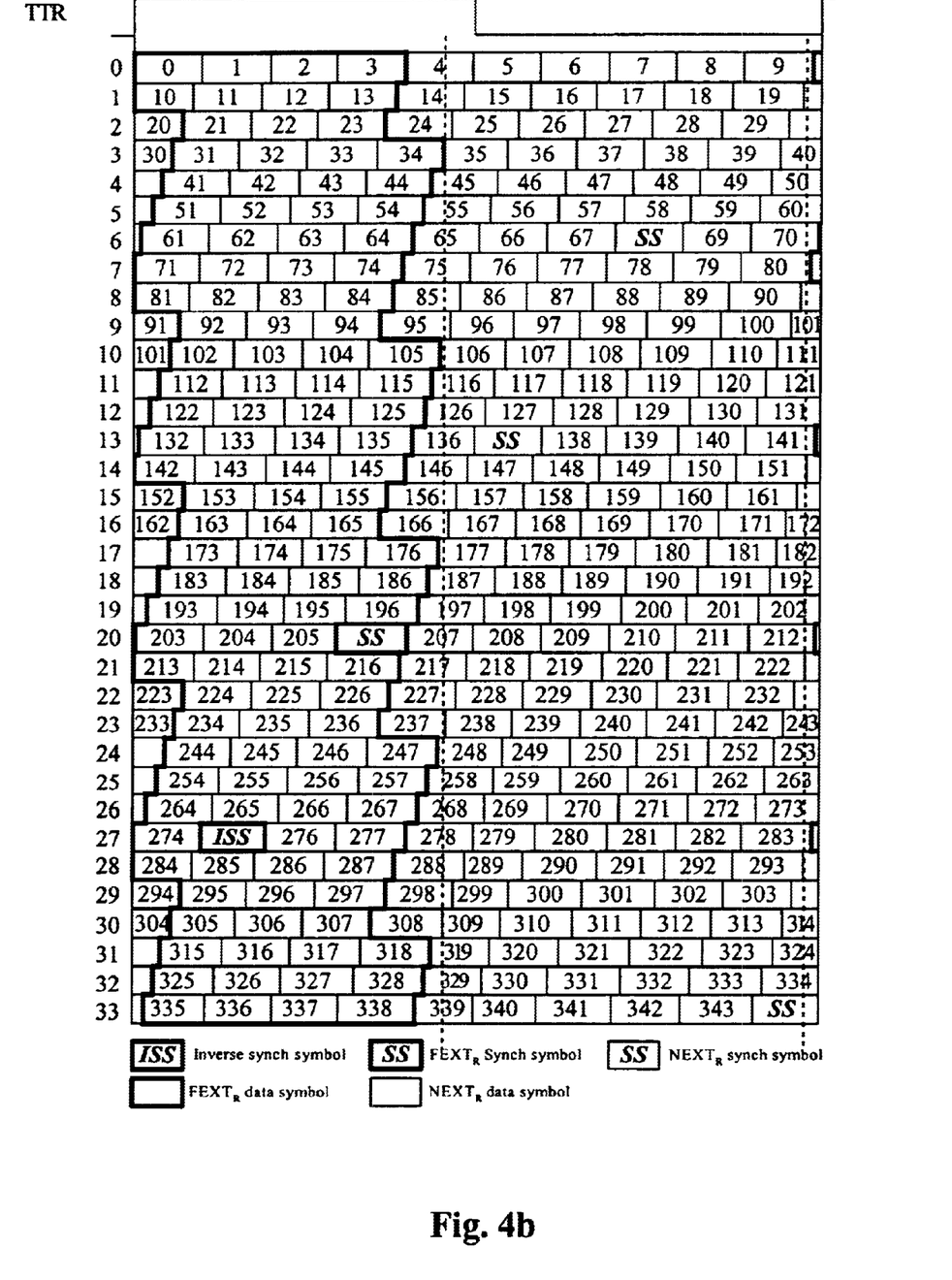
FIG. 4b is an exemplar downstream symbol pattern in a hyperframe with a cyclic prefix inserted in accordance with the present invention.

During transmission signal period C-RATE1, the cyclic prefix is introduced. The symbol boundary is then realigned, and FEQ 113 is trained on all the FEXT symbols from sequence C-RATE1 through SHOWTIME. This FEQ 113 training is referred to as later selective FEQ training. The SHOWTIME transmission signal period continues as long as the connection between the two transceivers is maintained. This is why the boxes representing the SHOWTIME periods for the transmission sequences shown in FIG. 3b have been left open. The downstream training symbol pattern in a hyperframe with a cyclic prefix is shown in FIG. 4b.

As the SHOWTIME transmission signal period continues, changes in the communication channel may occur. As such, FEQ 113 is selectively updated throughout the SHOWTIME transmission signal period. This process (also referred to as FEQ adaptation) keeps adapting a set of FEQ coefficients to the changing channel conditions. This selective updating of FEQ 113 performed during transmission signal period SHOWTIME is different than the FEQ training performed there. As explained above, FEQ 113 is trained on all the FEXT symbols from sequence C-RATE1 through SHOWTIME. On the other hand, FEQ 113 may be updated on both NEXT and FEXT symbols during the transmission signal period SHOWTIME.

This selective updating of FEQ 113, however, is different between NEXT and FEXT symbols. There are two bit-maps that comprise the transmission from one transceiver to the other. One bitmap is for NEXT symbols, and one bitmap is for FEXT symbols. In each bit-map, a number of bins (also referred to as sub-channels) are used to send data. The FEQ's 113 for those used bins will be updated. There is one FEQ 113 for each bin. If a bin is used in NEXT time, but not in FEXT time, FEQ 113 for this bin is updated only in NEXT symbols. If this bin is used in FEXT time, but not in NEXT time, FEQ 113 for this bin is updated only in FEXT symbols. If this bin is used in NEXT time and FEXT time, FEQ 113 for this bin is updated in all symbols. If this bin is not used in either NEXT time or FEXT time, FEQ 113 for this bin is not updated. In FBM mode, NEXT symbols are not used for data transmission in SHOWTIME. Therefore, FEQ 113 is not updated in NEXT time.

The adaptation can be selectively performed during FEXT and NEXT symbols where the number of bits per symbol is non-zero because the signal to noise ratio for those channels is satisfactory. Otherwise, those channels would not have been selected for data transmission.

The ATU-R transmit sequence (of the right side of FIGS. 3a and 3b) defines the transmission from the remote customer's premises to the central office. This sequence will now be discussed. The transmission signal periods G.994.1, R-QUIET2 through R-SEGUE1 are the handshaking and initial training signals. As explained earlier, Recommendation G.994.1 defines a G.hs handshaking scheme where preliminary information is exchanged between the ATU-C and the ATU-R. During the initial training phase of the ATU-R transmit sequence, the ATU-C receives the training signal periods R-REVERB1 through R-SEGUE1 where the training symbols are without cyclic prefix.

During transmission signal period R-REVERB1, TEQ 108 is selectively trained. At this point in the transmission sequence, inter-symbol interference is not eliminated because the cyclic prefix has not been introduced yet. As such, not only are the NEXT symbols noisy, but also the FEXT symbols adjacent to NEXT symbols are noisy. TEQ 108 is, therefore, trained only on the FEXT symbols that are not adjacent to NEXT symbols transmission signal period R-REVERB1. Hence, TEQ 108 training is selective. However, TEQ 108 will not be used until transmission signal period R-REVERB2. Once TEQ 108 is trained, the symbol boundary is aligned.

Figure 5A:
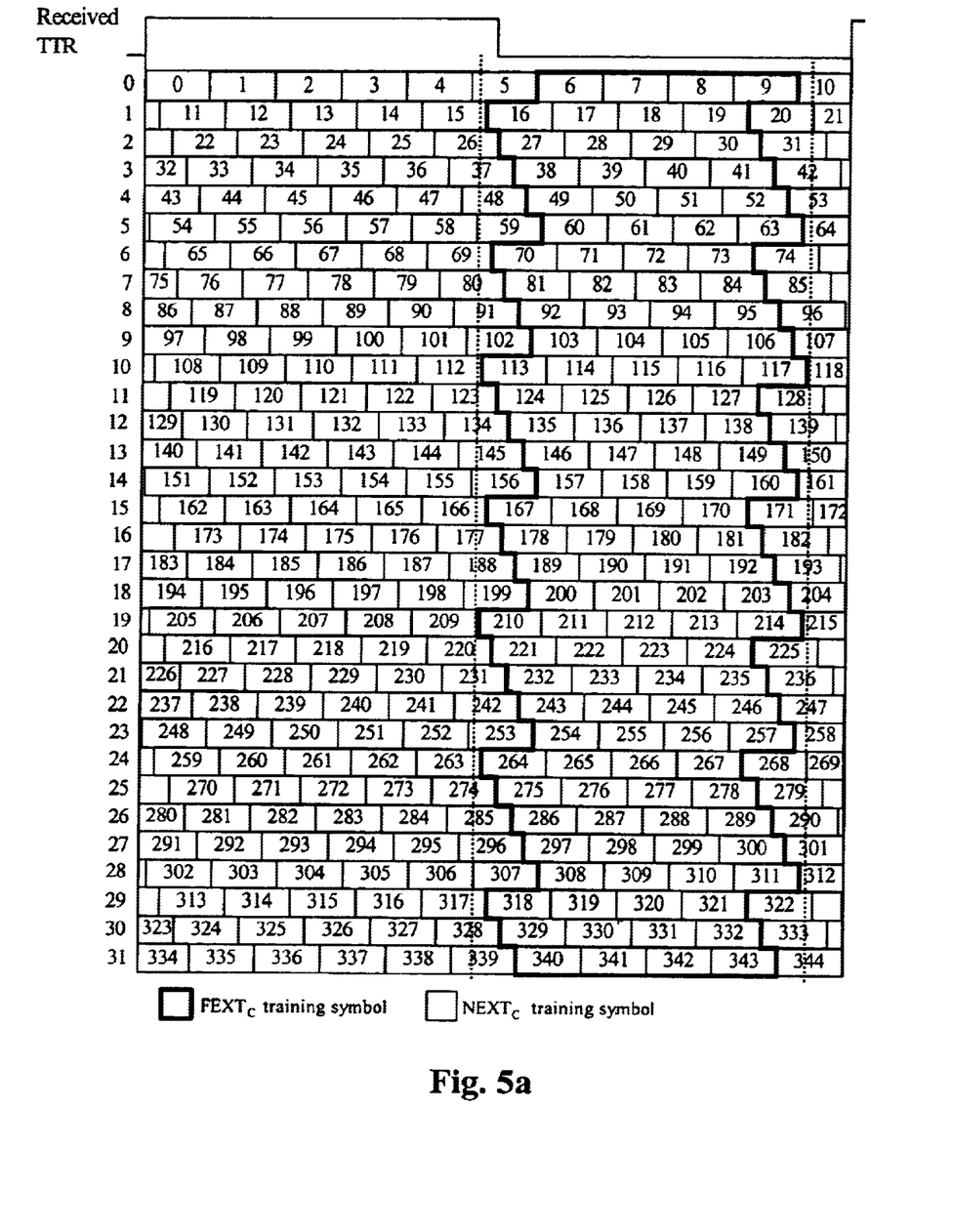
FIG. 5a is an exemplar upstream symbol pattern in a hyperframe without a cyclic prefix inserted in accordance with the present invention.

During transmission signal periods R-QUIET3 through R-ECT, there is no equalizer training. During period R-REVERB2, the signals received by the ATU-C are propagated through TEQ 108 and FFT demodulator 110. The frequency domain signals that are the output of the FFT demodulator are used to train FEQ 113. This FEQ 113 training is referred to as selective FEQ reference training. Although TEQ 108 is used, inter-symbol interference is not eliminated yet because the cyclic prefix has not been introduced yet. Therefore, not only are the NEXT symbols noisy, the FEXT symbols adjacent to NEXT symbols are also noisy due to inter-symbol interference. Hence, the reference training of FEQ 113 is performed only on the FEXT symbols that are not adjacent to NEXT symbols and therefore is selective. The upstream training symbol pattern in a hyperframe without a cyclic prefix is shown in FIG. 5a.

Figure 5B:
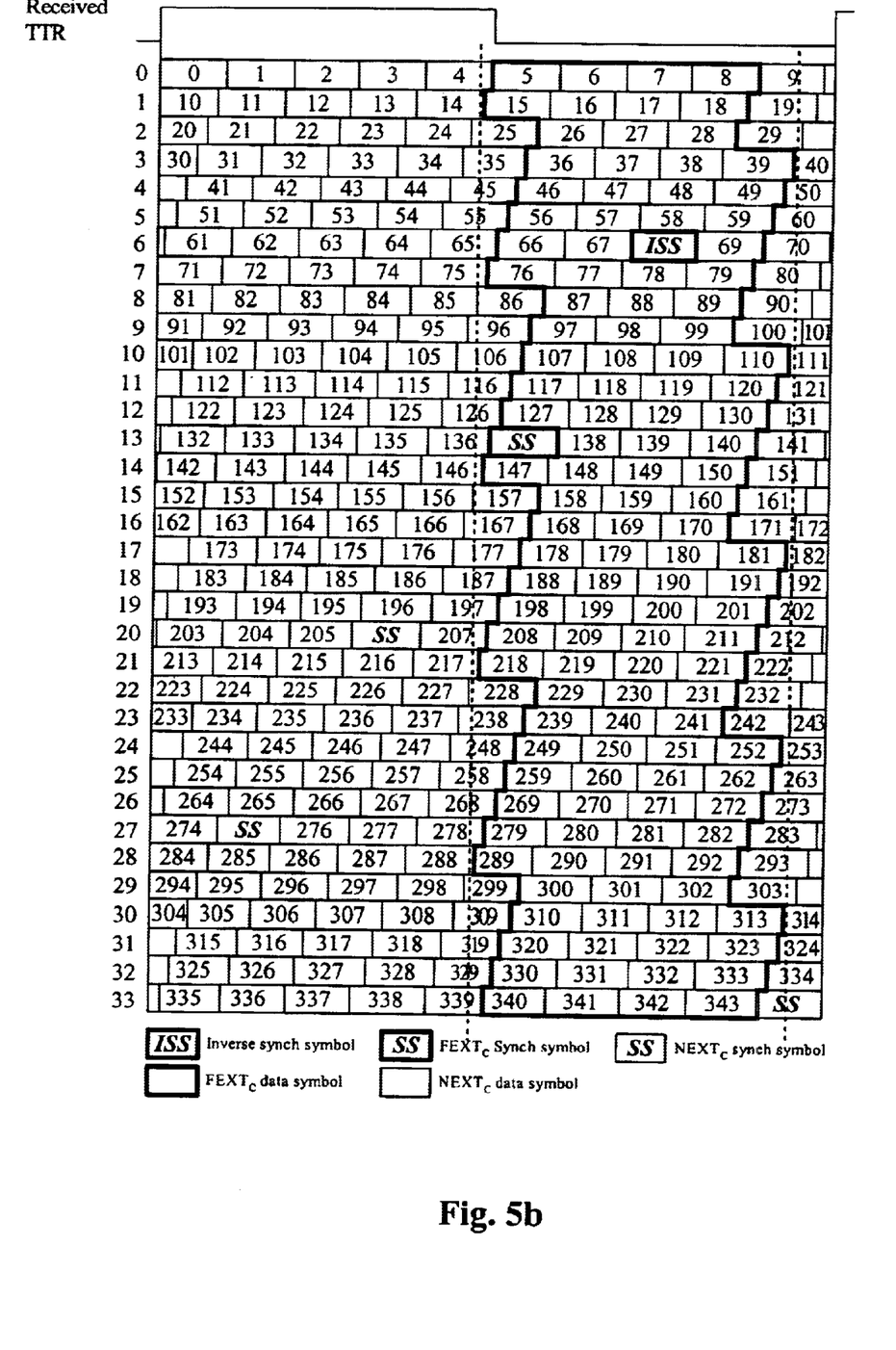
FIG. 5b is an exemplar upstream symbol pattern in a hyperframe with a cyclic prefix inserted in accordance with the present invention.

During transmission signal period R-REVERB3, the cyclic prefix is introduced, and the symbol boundary is realigned. FEQ 113 trains on all the FEXT symbols from transmission signal periods R-REVERB3 through SHOWTIME. This FEQ training 113 is referred to as selective later FEQ training. The SHOWTIME transmission signal period continues as long as the connection between the two transceivers is maintained. The upstream training symbol pattern in a hyperframe with a cyclic prefix is shown in FIG. 5b.

As the SHOWTIME transmission signal period continues, changes in the communication channel may occur. As such, FEQ 113 is updated throughout the SHOWTIME transmission signal period. This selective update process, as explained above with reference to downstream communication, keeps adapting a set of FEQ coefficients to the changing channel conditions. For purposes of clarity, this selective update process is now described with reference to upstream communication.

The selective updating of the upstream FEQ 113 (also referred to as the ATU-C FEQ 113) performed during transmission signal period SHOWTIME is different than the FEQ training performed there. As explained above, FEQ 113 trains on all the FEXT symbols from transmission signal periods R-REVERB3 through SHOWTIME. On the other hand, FEQ 113 may be updated on both NEXT and FEXT symbols during the transmission signal period SHOWTIME. This selective updating of FEQ 113, however, is different between NEXT and FEXT symbols. There are two bit-maps that comprise the transmission from one transceiver to the other. One bitmap is for NEXT symbols, and one bitmap is for FEXT symbols. In each bit-map, a number of bins (also referred to as sub-channels) are used to send data. The FEQ's 113 for those used bins will be updated. There is one FEQ 113 for each bin. If a bin is used in NEXT time, but not in FEXT time, FEQ 113 for this bin is updated only in NEXT symbols. If this bin is used in FEXT time, but not in NEXT time, FEQ 113 for this bin is updated only in FEXT symbols. If this bin is used in NEXT time and FEXT time, FEQ 113 for this bin is updated in all symbols. If this bin is not used in either NEXT time or FEXT time, FEQ 113 for this bin is not updated. In FBM mode, NEXT symbols are not used for data transmission in SHOWTIME. Therefore, FEQ 113 is not updated in NEXT time.

The adaptation can be performed during FEXT and NEXT symbols where the number of bits per symbol is non-zero because the signal to noise ratio for those sub-channels is satisfactory. Otherwise, those channels would not have been selected for data transmission.

FIG. 4a is an exemplar downstream symbol pattern in a hyperframe without a cyclic prefix inserted in accordance with the present invention. As previously stated, the interference from the TCM-ISDN during NEXT symbols may be very strong. Thus, as previously discussed above, training TEQ 108 and FEQ 113 during NEXT symbols and FEXT symbols adjacent to NEXT symbols may greatly affect the stability of the TEQ and FEQ equalizers, and may cause significant performance degradation. Therefore only the symbols in the following set are used when training TEQ 108 and FEQ 113 without a cyclic prefix inserted: {1, 2, 12, 13, 23, 24, 34, 35, 44, 45, 55, 56, 66, 67, 77, 78, 88, 89, 98, 99, 109, 110, 120, 121, 131, 132, 141, 142, 143, 152, 153, 163, 164, 174, 175, 185, 186, 195, 196, 206, 207, 217, 218, 228, 229, 238, 239, 240, 249, 250, 260, 261, 271, 272, 282, 283, 292, 293, 303, 304, 314, 315, 325, 326, 336, 337}.

Error signals are used to update a set of FEQ coefficients. Symbol decision 114 selects the right signal point from the constellation. The difference between the output of symbol decision 114 and the output of FEQ 113 is the error signal used for FEQ 113 adaptation. These error signals are set to zero on all NEXT symbols and FEXT symbols that are adjacent to NEXT symbols. When an error signal is forced to zero, FEQ updating is actually disabled. The zero error symbols are all the symbols not in the set listed above namely: {0, 3–11, 14–22, 25, 26–33 . . . 327–335, 338–344}.

FIG. 4b is an exemplar downstream symbol pattern in a hyperframe with a cyclic prefix inserted in accordance with the present invention. As explained above, the cyclic prefix is introduced during transmission signal period C-RATE1, and the symbol boundary is realigned. FEQ 113 is then trained on all the FEXT symbols from transmission signal periods C-RATE1 through SHOWTIME. Specifically, and with reference to FIG. 4b, FEQ 113 is trained on the following FEXT symbols: {0–3, 10–13, 21–23, 31–34, 41–44, 51–54, 61–64, 71–74, 81–84, 92–94, 102–105, 112–115, 122–125, 132–135, 142–145, 153–155, 163–165, 173–176, 183–186, 193–196, 203–206, 213–216, 224–226, 234–236, 244–247, 254–257, 264–267, 274–277, 284–287, 295–297, 305–307, 315–318, 325–328, 335–338}.

The inter-symbol interference is basically eliminated by TEQ 108 and the cyclic prefix. Therefore, the FEXT symbols adjacent to NEXT symbols are not affected by the TCM-ISDN cross-talk noise, which exists in NEXT symbols only. The errors for the FEQ update are set to zero on all NEXT symbols, which are the symbols not listed above. Specifically, these zero error NEXT symbols are the non-shaded symbols of FIG. 4b.

Only one set of FEQ coefficients is used for both FEXT periods and NEXT periods. During transmission signal period SHOWTIME, this set of FEQ coefficients is selectively updated to keep tracking the channel changes. A subset of the channels may be used for data transmission in FEXT periods, while another subset (may or may not be the same) can be used for data transmission in NEXT periods. The selective updating of the downstream FEQ 113 during transmission signal period SHOWTIME is explained above with reference to the left side of FIGS. 3a and 3b.

FIG. 5a is an exemplar upstream symbol pattern in a hyperframe without a cyclic prefix inserted in accordance with the present invention. As stated earlier, the interference from the TCM-ISDN during the transmission of NEXT symbols may be very strong. Training TEQ 108 and FEQ 113 during NEXT symbols and FEXT symbols adjacent to NEXT symbols may greatly affect the equalizers accuracy, and cause significant performance degradation. Therefore only the symbols in following set are used in training TEQ 108 and FEQ 113 without a cyclic prefix added: {7, 8, 17, 18, 28, 29, 39, 40, 50, 51, 61, 62, 71, 72, 82, 83, 93, 94, 104, 105, 114, 115, 116, 125, 126, 136, 137, 147, 148, 158, 159, 168, 169, 179, 180, 190 191, 201, 202, 211, 212, 213, 222, 223, 233, 234, 244, 245, 255, 256, 265, 266, 276, 277, 287, 288, 298, 299, 309, 310, 319, 320, 330, 331, 341, 342}.

FIG. 5b is an exemplar upstream symbol pattern in a hyperframe with a cyclic prefix inserted in accordance with the present invention. As explained above, the cyclic prefix is introduced during transmission signal period R-REVERB3, and the symbol boundary is realigned. FEQ 113 is then trained on all the FEXT symbols from transmission signal periods R-REVERB3 through SHOWTIME. Specifically, and with reference to FIG. 5b, FEQ 113 is trained on the following FEXT symbols: {5–8, 15–18, 26–28, 36–39, 46–49, 56–59, 66–69, 76–79, 87–89, 97–99, 107–110, 117–120, 127–130, 137–140, 147–150, 158–160, 168–170, 178–181, 188–191, 198–201, 208–211, 218–221, 229–231, 239–241, 249–252, 259–262, 269–272, 279–282, 289–292, 300–302, 310–313, 320–323, 330–333, 340–343}.

The inter-symbol interference is basically eliminated by TEQ 108 and the cyclic prefix. Therefore, the FEXT symbols adjacent to NEXT symbols are not affected by the TCM-ISDN noise, which exists in NEXT symbols only. The error signals used for FEQ updating (the difference between the output of symbol decision 114 and the output of FEQ 113) are set to zero on all NEXT symbols, which are the symbols not listed above with respect to FIG. 5b. Specifically, these zero error NEXT symbols are the non-shaded symbols of FIG. 5b. Only one set of FEQ coefficients is used for both FEXT periods and NEXT periods. During transmission signal period SHOWTIME, this set of FEQ coefficients is selectively updated to keep tracking the channel changes. A subset of the channels may be used for data transmission in FEXT periods, while another subset (may or may not be the same) can be used for data transmission in NEXT periods. The selective updating of the upstream FEQ 113 during transmission signal period SHOWTIME is explained above with reference to the right side of FIGS. 3a and 3b.

Figure 6A:
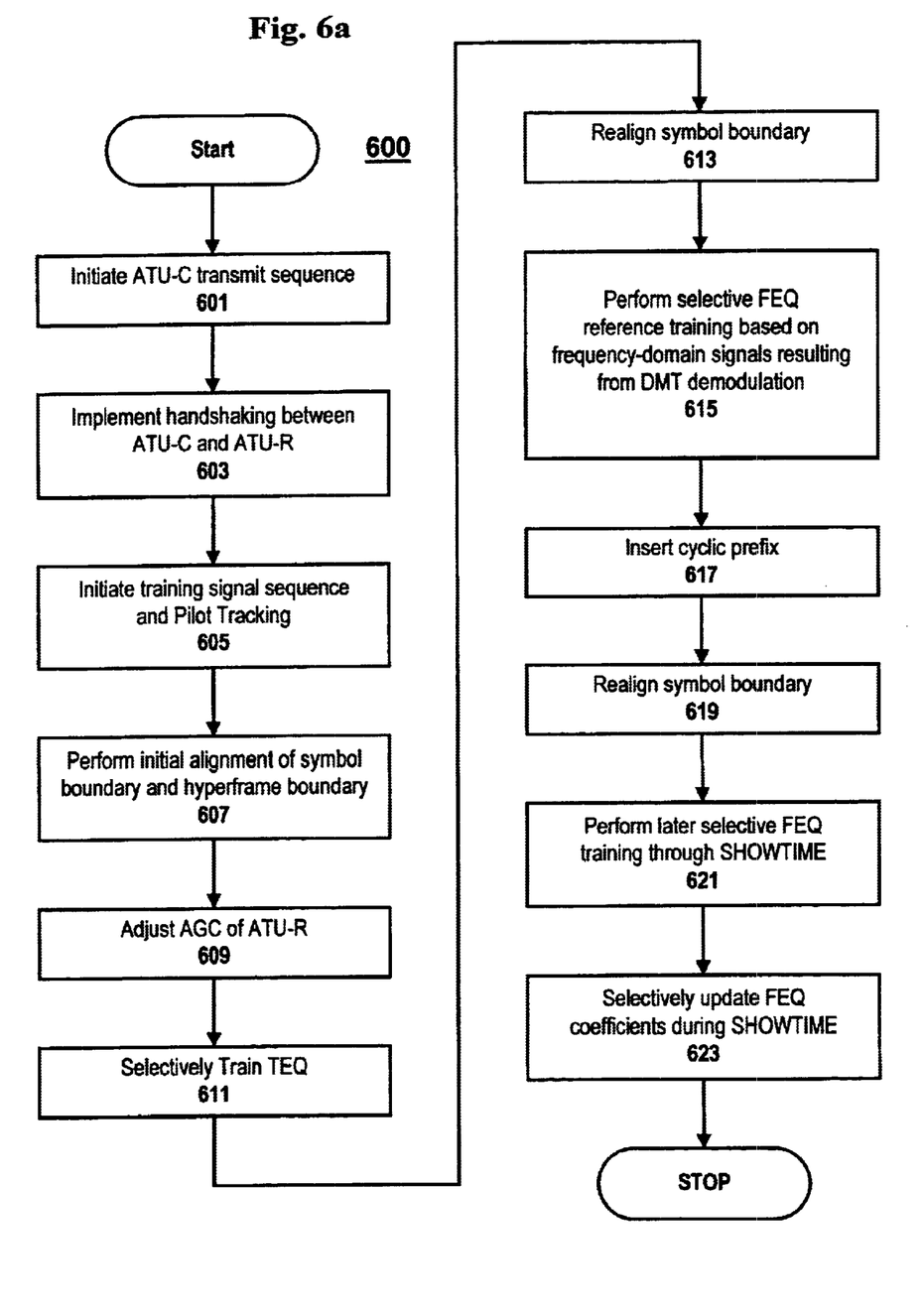
FIG. 6a shows one embodiment of a method for training an equalizer of an ATU-R operating in a TCM-ISDN environment in accordance with the present invention.

FIG. 6a shows one embodiment of a method for training an equalizer of an ATU-R operating in a TCM-ISDN environment in accordance with the present invention. The overall method is generally referred to as process 600. Process 600 begins by initiating 601 the ATU-C transmit sequence. This transmit sequence is shown on the left side of FIGS. 3a and 3b, and defines the transmission sequence from a central office transceiver to a remote customer's transceiver. Process 600 continues by implementing 603 a handshaking sequence between the ATU-C and the ATU-R. This handshaking sequence is defined by recommendation G.994.1 and establishes a valid connection between the transceivers of the central office and the customer's premises.

Once this valid connection is established, process 600 continues by initiating 605 a training sequence from transmission signal periods C-PILOT1 through C-SEGUE1. No cyclic prefix is inserted into the training symbols during these periods. The training sequence is transmitted for the remote ATU-R to train its receiver, including timing recovery and equalizer training. The timing recovery (pilot tracking) is for ATU-R receiver to lock its clock frequency to the remote ATU-C's clock frequency. The equalizer is used to compensate the channel distortion. During transmission signal period C-PILOT1, process 600 includes performing 607 an initial alignment of the symbol boundary and the hyperframe boundary. This symbol boundary, however, may not be accurate because a TEQ of the ATU-R has not been trained. Once the TEQ is trained, the symbol boundary can be realigned as will be explained below. Pilot tracking also begins during period C-PILOT1.

During transmission signal periods C-REVERB1 through C-ECT, process 600 includes the ATU-R adjusting 609 its automatic gain control (AGC) to an appropriate level during C-REVERB1. This adjusting is to optimize the performance of the receiver of the ATU-R. During transmission signal period C-REVERB2, process 600 includes selectively training 611 the TEQ of the ATU-R. The TEQ is trained only on the FEXT symbols that are not adjacent to NEXT symbols. The trained TEQ, however, is not actually used until period C-REVERB3. Once the TEQ is trained during period C-REVERB2, process 600 includes realigning 613 the symbol boundary during period C-REVERB2.

During the transmission signal period C-REVERB3, the signals received by the ATU-R are propagated through a TEQ and a FFT demodulator of the receiver of that ATU-R. The FFT demodulator outputs frequency domain signals as explained above. Process 600 continues by performing 615 selective FEQ reference training based those frequency-domain signals resulting from the FFT. The FEQ is a component of the receiver of the ATU-R. The trained TEQ is used during this period, but inter-symbol interference is not eliminated yet because the cyclic prefix has not been introduced yet. Therefore, not only are the NEXT symbols noisy, the FEXT symbols adjacent to NEXT symbols are also noisy due to inter-symbol interference. Hence, process 600 includes performing 615 the selective FEQ reference training only on the FEXT symbols that are not adjacent to NEXT symbols.

During transmission signal period C-RATE1, process 600 includes inserting 617 the cyclic prefix. Once the cyclic prefix is inserted, process 600 continues by realigning 619 the symbol boundary in the beginning of period C-RATE1. Process 600 continues by performing 621 later selective FEQ training on all the FEXT symbols from sequence C-RATE1 through SHOWTIME. The SHOWTIME transmission signal period continues as long as the connection between the two transceivers is maintained. While the SHOWTIME period continues, process 600 continues by selectively updating 623 a set of FEQ coefficients. Such updating maintains optimal communication channel performance through out the SHOWTIME period as explained above. One result of process 600 is that inter-symbol interference is eliminated by the TEQ and the cyclic prefix. Therefore, the FEXT symbols adjacent to NEXT symbols are no longer affected by the TCM-ISDN cross-talk noise. Such noise now exists only in NEXT symbols.

Figure 6B:
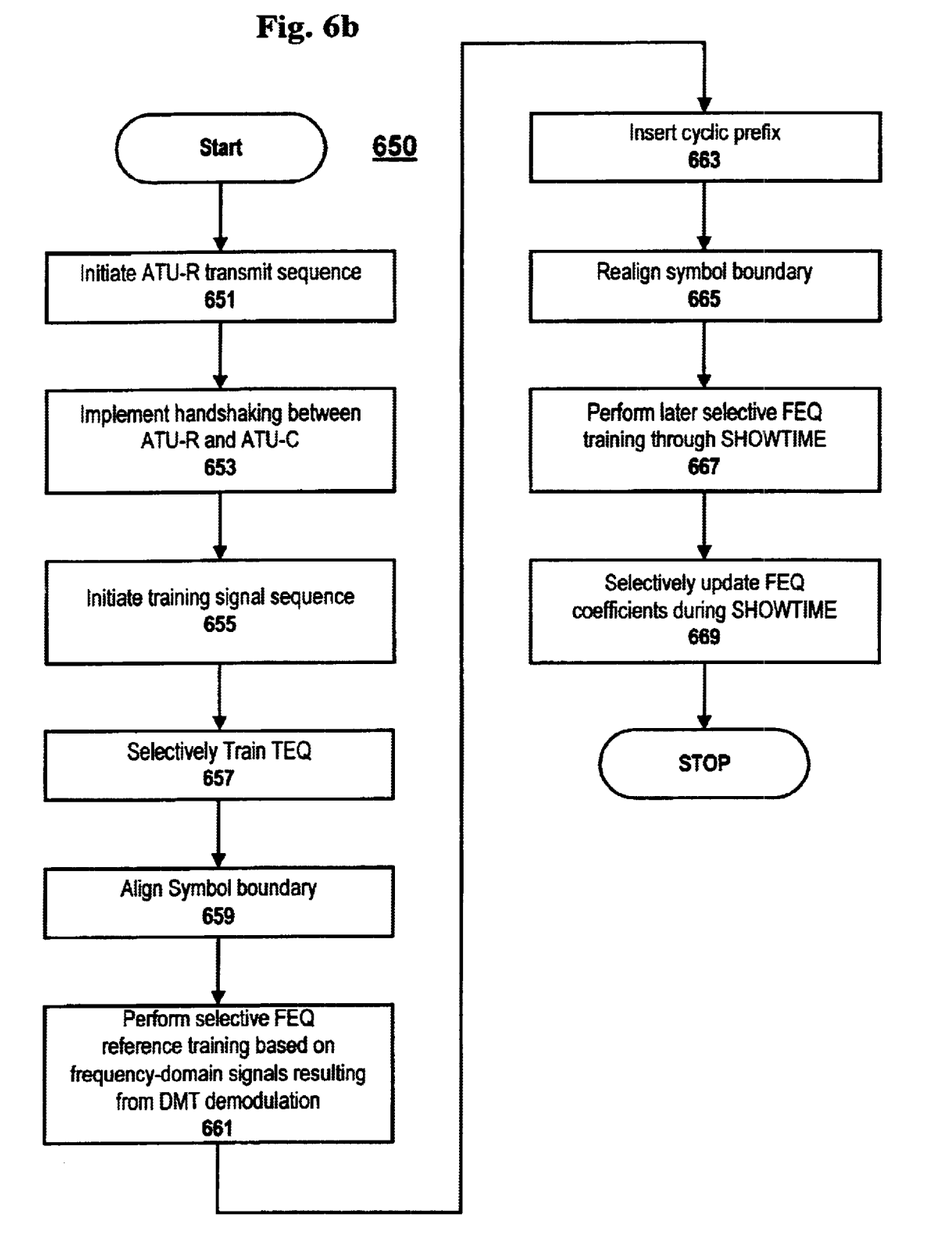
FIG. 6b shows one embodiment of a method for training an equalizer of an ATU-C operating in a TCM-ISDN environment in accordance with the present invention.

FIG. 6b shows one embodiment of a method for training an equalizer of an ATU-C operating in a TCM-ISDN environment in accordance with the present invention. The overall method is generally referred to as process 650. Process 650 begins by initiating 651 the ATU-R transmit sequence. This transmit sequence is shown on the right side of FIGS. 3a and 3b, and defines the transmission sequence from a remote customer's transceiver to a central office transceiver. Process 650 continues by implementing 653 a handshaking sequence between the ATU-R and the ATU-C. This handshaking sequence is defined by recommendation G.994.1 and establishes a valid connection between the transceivers of the customer premises and the central office.

Once this valid connection is established, process 650 continues by initiating 655 a training sequence from transmission signal periods R-QUIET2 through R-SEGUE1. During this initial training phase, the ATU-C receives the training symbols with no cyclic prefix inserted. As explained earlier, such training improves the reliability of the communication link. During transmission signal period R-REVERB1, process 650 includes selectively training 657 a TEQ of the ATU-C. The TEQ is trained only on the FEXT symbols that are not adjacent to NEXT symbols. Once the TEQ is trained during period R-REVERB1, process 650 includes aligning 659 the symbol boundary during period R-REVERB1. During transmission signal periods R-QUIET3 through R-ECT, there is no equalizer training.

During the transmission signal period R-REVERB2, the signals received by the receiver of the ATU-C are propagated through a TEQ and a FFT demodulator of that receiver. The FFT demodulator outputs frequency domain signals. Process 650 continues by performing 661 selective FEQ reference training based on those frequency-domain signals at the output of the FFT. The FEQ is a component of the receiver of the ATU-C. The trained TEQ is used during this period, but inter-symbol interference is not eliminated yet because the cyclic prefix has not been introduced yet. Therefore, not only are the NEXT symbols noisy, the FEXT symbols adjacent to NEXT symbols are also noisy due to inter-symbol interference. Hence, process 650 includes performing 661 the selective FEQ reference training only on the FEXT symbols that are not adjacent to NEXT symbols.

During transmission signal period R-REVERB3, process 650 includes inserting 663 the cyclic prefix. Once the cyclic prefix is inserted, process 650 continues by realigning 665 the symbol boundary during period R-REVERB3. Process 650 continues by performing 667 later selective FEQ training on all the FEXT symbols from sequence R-REVERB3 through SHOWTIME. The SHOWTIME transmission signal period continues as long as the connection between the two transceivers is maintained. While the SHOWTIME period continues, process 650 continues by selectively updating 669 a set of FEQ coefficients. Such updating maintains optimal communication channel performance through out the SHOWTIME period as explained above. One result of process 650 is that inter-symbol interference is eliminated by the TEQ. Therefore, the FEXT symbols adjacent to NEXT symbols are no longer affected by the TCM-ISDN cross-talk noise. Such noise now exists only in NEXT symbols.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for avoiding interference received by a Digital Subscriber Line (DSL) transceiver operating under a Time Compression Multiplexing-Integrated Services Digital Network (TCM-ISDN), wherein the transceiver includes a processor comprising a time domain equalizer and a number of frequency domain equalizers, the method comprising:

selectively training the time-domain equalizer of the transceiver during a first training signal sequence where a first plurality of training symbols comprising FEXT and NEXT symbols are transmitted without a cyclic prefix to the transceiver;

selectively training at least one of the frequency-domain equalizers of the transceiver during the first training signal sequence; and selectively training at least one of the frequency-domain equalizers of the transceiver during a second training signal sequence where a second plurality of training symbols comprising FEXT and NEXT symbols are transmitted with a cyclic prefix to the transceiver.

2. The method of claim 1, wherein the first training signal sequence ranges from a transmission signal period C-PILOT1 through a transmission signal period C-SEGUE1.

3. The method of claim 1 further comprising:

before selectively training the time-domain equalizer, performing a TCM-ISDN timing reference alignment.

4. The method of claim 1 further comprising:

adjusting an automatic gain control of the transceiver during the first training signal sequence.

5. The method of claim 4, wherein the step of adjusting is performed during a transmission signal period C-REVERB1 through a transmission signal period C-ECT.

6. The method of claim 1, wherein the step of selectively training the time-domain equalizer is performed during a transmission signal period C-REVERB2.

7. The method of claim 1, further comprising:

aligning a symbol boundary of the first plurality of training symbols during a transmission signal period C-REVERB2.

8. The method of claim 1, wherein the step of selectively training the time-domain equalizer is performed only under FEXT symbols that are not adjacent to NEXT symbols.

9. The method of claim 1, wherein the step of selectively training at least one of the frequency-domain equalizers during the first training signal sequence is performed only under the FEXT symbols that are not adjacent to NEXT symbols.

10. The method of claim 1, wherein the step of selectively training at least one of the frequency-domain equalizers during the second training signal sequence is performed under FEXT symbols, including a number of FEXT symbols adjacent to NEXT symbols.

11. The method of claim 1, wherein the first plurality of training symbols further comprises a hyperframe, the hyperframe having 345 symbols sequentially numbered from left to right and top to bottom, the sequential numbering starting at symbol 0 in an upper left portion of the frame and ending at symbol 344 in a lower right portion of the frame.

12. The method of claim 11, wherein the steps of selectively training the time-domain equalizer and selectively training at least one of the frequency-domain equalizers during the first training signal sequence are performed under any one of a subset of FEXT symbols included in the hyperframe, the subset of FEXT symbols including symbols: {1, 2, 12, 13, 23, 24, 34, 35, 44, 45, 55, 56, 66, 67, 77, 78, 88, 89, 98, 99, 109, 110, 120, 121, 131, 132, 141, 142, 143, 152, 153, 163, 164, 174, 175, 185, 186, 195, 196, 206, 207, 217, 218, 228, 229, 238, 239, 240, 249, 250, 260, 261, 271, 272, 282, 283, 292, 293, 303, 304, 314, 315, 325, 326, 336, 337}.

13. The method of claim 11, wherein the steps of selectively training the time-domain equalizer and selectively training at least one of the frequency-domain equalizers during the first training signal sequence are performed under any one of a subset of FEXT symbols included in the hyperframe, the subset of FEXT symbols including symbols: {7, 8, 17, 18, 28, 29, 39, 40, 50, 51, 61, 62, 71, 72, 82, 83, 93, 94, 104, 105, 114, 115, 116, 125, 126, 136, 137, 147, 148, 158, 159, 168, 169, 179, 180, 190, 191, 201, 202, 211, 212, 213, 222, 223, 233, 234, 244, 245, 255, 256, 265, 266, 276, 277, 287, 288, 298, 299, 309, 310, 319, 320, 330, 331, 341, 342}.

14. The method of claim 1, wherein the second training signal sequence ranges from a transmission signal period C-RATE1 through a transmission signal period SHOWTIME.

15. The method of claim 1, wherein the cyclic prefix is introduced during a transmission signal period C-RATE1.

16. The method of claim 1 further comprising:

aligning a symbol boundary of the second plurality of training symbols during a transmission signal period C-RATE1.

17. The method of claim 1, wherein the system operates in either a FEXT bitmap mode, or a dual bitmap mode.

18. The method of claim 1, wherein the step of selectively training at least one of the frequency-domain equalizers during the second training signal sequence is performed under FEXT symbols, including a number of FEXT symbols adjacent to NEXT symbols, during a transmission signal period C-RATE1 through a transmission signal period SHOWTIME.

19. The method of claim 1, wherein the second plurality of training symbols further comprises a hyperframe, the hyperframe having 345 symbols sequentially numbered from left to right and top to bottom, the sequential numbering starting at symbol 0 in an upper left portion of the frame and ending at symbol 344 in a lower right portion of the frame.

20. The method of claim 19, wherein the step of selectively training at least one of the frequency-domain equalizers during the second training signal sequence is performed under any one of a set of FEXT symbols included in the hyperframe, the set of FEXT symbols including symbols: {0–3, 10–13, 21–23, 31–34, 41–44, 51–54, 61–64, 71–74, 81–84, 92–94, 102–105, 112–115, 122–125, 132–135, 142–145, 153-155, 163–165, 173–176, 183–186, 193–196, 203–206, 213–216, 224–226, 234–236, 244–247, 254–257, 264–267, 274–277, 284–287, 295–297, 305–307, 315–318, 325–328, 335–338}.

21. The method of claim 19, wherein the step of selectively training at least one of the frequency-domain equalizers during the second training signal sequence is performed under any one of a set of FEXT symbols included in the hyperframe, the set of FEXT symbols including symbols: {5–8, 15–18, 26–28, 36–39, 46–49, 56–59, 66–69, 76–79, 87–89, 97–99, 107–110, 117–120, 127–130, 137–140, 147–150, 158–160, 168–170, 178–181, 188–191, 198–201, 208–211, 218–221, 229–231, 239–241, 249–252, 259–262, 269–272, 279–282, 289–292, 300–302, 310–313, 320–323, 330–333, 340–343}.

22. The method of claim 1, wherein the step of selectively training at least one of the frequency-domain equalizers during the first training signal sequence further comprises selectively updating a set of frequency-domain equalizer coefficients based on error signals generated by that frequency-domain equalizer and symbol decision.

23. The method of claim 1, wherein the step of selectively training at least one of the frequency-domain equalizers during the second training signal sequence further comprises selectively updating a set of frequency-domain equalizer coefficients based on error signals generated by that frequency-domain equalizer and symbol decision.

24. The method of claim 1 further comprising:
  selectively updating at least one of the frequency-domain equalizers of the transceiver during the second training signal sequence.

25. The method of claim 24 wherein the step of selectively updating at least one of the frequency-domain equalizers further comprises selectively updating a set of frequency-domain equalizer coefficients based on error signals generated by that frequency-domain equalizer and symbol decision.

26. The method of claim 24 wherein the step of selectively updating at least one of the frequency-domain equalizers is performed under FEXT and NEXT symbols during a transmission signal period SHOWTIME.

27. The method of claim 24, wherein the FEXT symbols are associated with a first bitmap and the NEXT symbols are associated with a second bitmap, the first and second bitmaps each being comprised of a number of sub-channels that are used for sending data, wherein the step of selectively updating at least one of the frequency-domain equalizers includes selectively updating a frequency-domain equalizer that is associated with a sub-channel that is used for sending data.

28. The method of claim 24 wherein the FEXT symbols are associated with a first bitmap and the NEXT symbols are associated with a second bitmap.

29. The method of claim 28 wherein each bitmap is comprised of a number of sub-channels that are used for sending data.

30. The method of claim 29 wherein each of the sub-channels that are used for sending data is associated with one of the frequency-domain equalizers.

31. The method of claim 30 wherein in response to one of the sub-channels being used to send data in NEXT time, but not in FEXT time, then the step of selectively updating at least one of the frequency-domain equalizers includes updating the frequency-domain equalizer associated with that sub-channel only in NEXT symbols.

32. The method of claim 30 wherein in response to one of the sub-channels being used to send data in FEXT time, but not in NEXT time, then the step of selectively updating at least one of the frequency-domain equalizers includes updating the frequency-domain equalizer associated with that sub-channel only in FEXT symbols.

33. The method of claim 30 wherein in response to one of the sub-channels being used to send data in NEXT time and FEXT time, then the step of selectively updating at least one of the frequency-domain equalizers includes updating the frequency-domain equalizer associated with that sub-channel in FEXT and NEXT symbols.

34. The method of claim 1, wherein the first training signal sequence ranges from a transmission signal period R-REVERB1 through a transmission signal period R-SEGUE1.

35. The method of claim 1, wherein the step of selectively training the time-domain equalizer is performed during a transmission signal period R-REVERB1.

36. The method of claim 1, further comprising:
  aligning a symbol boundary of the first plurality of training symbols during a transmission signal period R-REVERB1.

37. The method of claim 1, wherein the second training signal sequence ranges from a transmission signal period R-REVERB3 through a transmission signal period SHOWTIME.

38. The method of claim 1, wherein the cyclic prefix is introduced during a transmission signal period R-REVERB3.

39. The method of claim 1, further comprising:
  aligning a symbol boundary of the second plurality of training symbols during a transmission signal period R-REVERB3.

40. The method of claim 1, wherein the step of selectively training at least one of the frequency-domain equalizers during the second training signal sequence is performed under all FEXT symbols during a transmission signal period R-REVERB3 through a transmission signal period SHOWTIME.

41. A method for performing equalizer training for a Digital Subscriber Line (DSL) system operating under Time Compression Multiplexing-Integrated Services Digital Network (TCM-ISDN) interference, wherein the system includes a first transceiver and a second transceiver, each transceiver having a time-domain equalizer and a frequency-domain equalizer, the method comprising:
  transmitting a first symbol pattern comprising FEXT and NEXT symbols in a hyperframe without a cyclic prefix;
  training the time-domain equalizer of the second transceiver during the FEXT symbols of the first symbol pattern that are not adjacent to any of the NEXT symbols of the first symbol pattern; and
  training the frequency-domain equalizer of the second transceiver during the FEXT symbols of the first symbol pattern that are not adjacent to any of the NEXT symbols of the first symbol pattern.

42. The method of claim 41, further comprising:
  transmitting a second symbol pattern comprising FEXT and NEXT symbols in a hyperframe with a cyclic prefix; and
  selectively training the frequency-domain equalizer of the second transceiver during the second symbol pattern.

43. A Digital Subscriber Line transceiver operating under TCM-ISDN interference, the transceiver comprising:
  a time-domain equalizer for compensating for channel distortion in time domain;
  a frequency-domain equalizer for compensating for channel distortion in frequency domain; and
  a digital signal processor for executing a process that comprises:
    training the time-domain equalizer during FEXT symbols of a first symbol pattern without a cyclic prefix, those FEXT symbols not being adjacent to any NEXT symbols of the first symbol pattern; and
    training the frequency-domain equalizer during the FEXT symbols of the first symbol pattern that are not adjacent to any of the NEXT symbols of the first symbol pattern.

44. The method of claim 43, further comprising:
  selectively training the frequency-domain equalizer during a second symbol pattern with a cyclic prefix.

* * * * *